(12) United States Patent
Bourke et al.

(10) Patent No.: US 10,962,258 B2
(45) Date of Patent: Mar. 30, 2021

(54) WATER HEATER CONTROLLER

(71) Applicant: RHEEM AUSTRALIA PTY LIMITED, Rydalmere (AU)

(72) Inventors: Brendan Bourke, Rydalmere (AU); Yue-Xin Peng, Rydalmere (AU); Lee Kernich, Rydalmere (AU)

(73) Assignee: Rheem Australia PTY Limited, Rydalmere (AU)

( * ) Notice: Subject to any disclaimer, the term of this patent is extended or adjusted under 35 U.S.C. 154(b) by 598 days.

(21) Appl. No.: 15/702,556

(22) Filed: Sep. 12, 2017

(65) Prior Publication Data
US 2018/0073770 A1    Mar. 15, 2018

(30) Foreign Application Priority Data

Sep. 14, 2016 (AU) ................. 2016903693

(51) Int. Cl.
*F24H 9/20* (2006.01)
*F24H 1/20* (2006.01)

(52) U.S. Cl.
CPC ........... *F24H 9/2021* (2013.01); *F24H 1/201* (2013.01)

(58) Field of Classification Search
None
See application file for complete search history.

(56) References Cited

U.S. PATENT DOCUMENTS

| | | | | |
|---|---|---|---|---|
| 4,110,632 A * | 8/1978 | Wyland | ...................... | H02J 3/14 236/46 R |
| 4,232,298 A * | 11/1980 | Ley | ..................... | G01R 21/1335 324/76.41 |
| 4,417,131 A * | 11/1983 | Carl | ....................... | F24H 3/0411 392/307 |
| 5,103,078 A * | 4/1992 | Boykin | .............. | G05D 23/1904 219/486 |
| 5,117,173 A * | 5/1992 | Oliva | .................... | H01M 10/48 320/127 |
| 5,168,170 A * | 12/1992 | Hartig | ....................... | H02J 3/14 307/34 |
| 5,903,213 A * | 5/1999 | Hodge | ................. | H02J 13/0037 340/12.33 |
| 6,157,292 A * | 12/2000 | Piercy | .................... | H04B 3/542 375/130 |
| 6,208,806 B1 * | 3/2001 | Langford | .............. | F24H 9/2021 392/449 |
| 7,516,106 B2 * | 4/2009 | Ehlers | ..................... | G06Q 10/10 705/412 |
| 7,802,121 B1 * | 9/2010 | Zansky | ................... | G06F 1/263 307/64 |
| 8,400,162 B1 * | 3/2013 | Jannson | ............... | G01R 31/367 324/427 |

(Continued)

*Primary Examiner* — Thor S Campbell
(74) *Attorney, Agent, or Firm* — Troutman Pepper Hamilton Sanders LLP

(57) ABSTRACT

A controller for an electric booster element in a water heater is described. The electric booster element is powered from mains power and the controller comprises a control module and a capacitive module adapted to store power and supply stored power to the control module. The control module produces a control signal for controlling a relay to supply or restrict mains power supply to said booster element, said control signal depending at least in part on time of use data.

23 Claims, 6 Drawing Sheets

(56) References Cited

U.S. PATENT DOCUMENTS

| | | | |
|---|---|---|---|
| 9,002,185 B2* | 4/2015 | Kreutzman | F24D 11/004 392/441 |
| 9,074,742 B1* | 7/2015 | Petrocy | G09F 9/3026 |
| 9,097,435 B2* | 8/2015 | Lichtenberger | F24H 1/202 |
| 9,234,664 B1* | 1/2016 | Hayner | F24H 9/2021 |
| 9,544,019 B1* | 1/2017 | Sebest | H04B 3/546 |
| 10,072,853 B2* | 9/2018 | Chaudhry | F24D 17/0021 |
| 10,443,894 B2* | 10/2019 | Branecky | F24H 1/201 |
| 2004/0161227 A1* | 8/2004 | Baxter | F24H 9/2021 392/454 |
| 2004/0176859 A1* | 9/2004 | Chian | H02J 7/34 700/12 |
| 2005/0111560 A1* | 5/2005 | Haines | H04B 3/54 375/257 |
| 2007/0131784 A1* | 6/2007 | Garozzo | F24F 11/30 236/51 |
| 2008/0272934 A1* | 11/2008 | Wang | H02J 3/14 340/870.11 |
| 2010/0141153 A1* | 6/2010 | Recker | H05B 33/0803 315/149 |
| 2012/0080944 A1* | 4/2012 | Recker | H05B 37/0281 307/25 |
| 2012/0152514 A1* | 6/2012 | Takasaki | F24D 19/1039 165/241 |
| 2012/0197449 A1* | 8/2012 | Sanders | G05B 15/02 700/291 |
| 2012/0271475 A1* | 10/2012 | Wang | H02J 3/14 700/295 |
| 2013/0256506 A1* | 10/2013 | Xu | G01S 3/7861 250/203.4 |
| 2014/0097758 A1* | 4/2014 | Recker | H05B 37/0272 315/152 |
| 2014/0265573 A1* | 9/2014 | Kreutzman | F24H 1/0018 307/31 |
| 2015/0040964 A1* | 2/2015 | Matalon | G01S 3/7861 136/246 |
| 2016/0299522 A1* | 10/2016 | Jones | G05B 15/02 |
| 2017/0186402 A1* | 6/2017 | Jeon | G09G 5/02 |
| 2017/0223807 A1* | 8/2017 | Recker | H05B 37/0281 |
| 2017/0241649 A1* | 8/2017 | Cave | F24D 12/02 |
| 2017/0285598 A1* | 10/2017 | Fitch | H02J 3/14 |
| 2017/0288599 A1* | 10/2017 | Chapman | H02S 10/00 |
| 2018/0041034 A1* | 2/2018 | Stewart | H02J 3/1828 |
| 2018/0231258 A1* | 8/2018 | Armstrong | F24H 1/201 |
| 2019/0019259 A1* | 1/2019 | Bazhinov | H01H 89/06 |

* cited by examiner

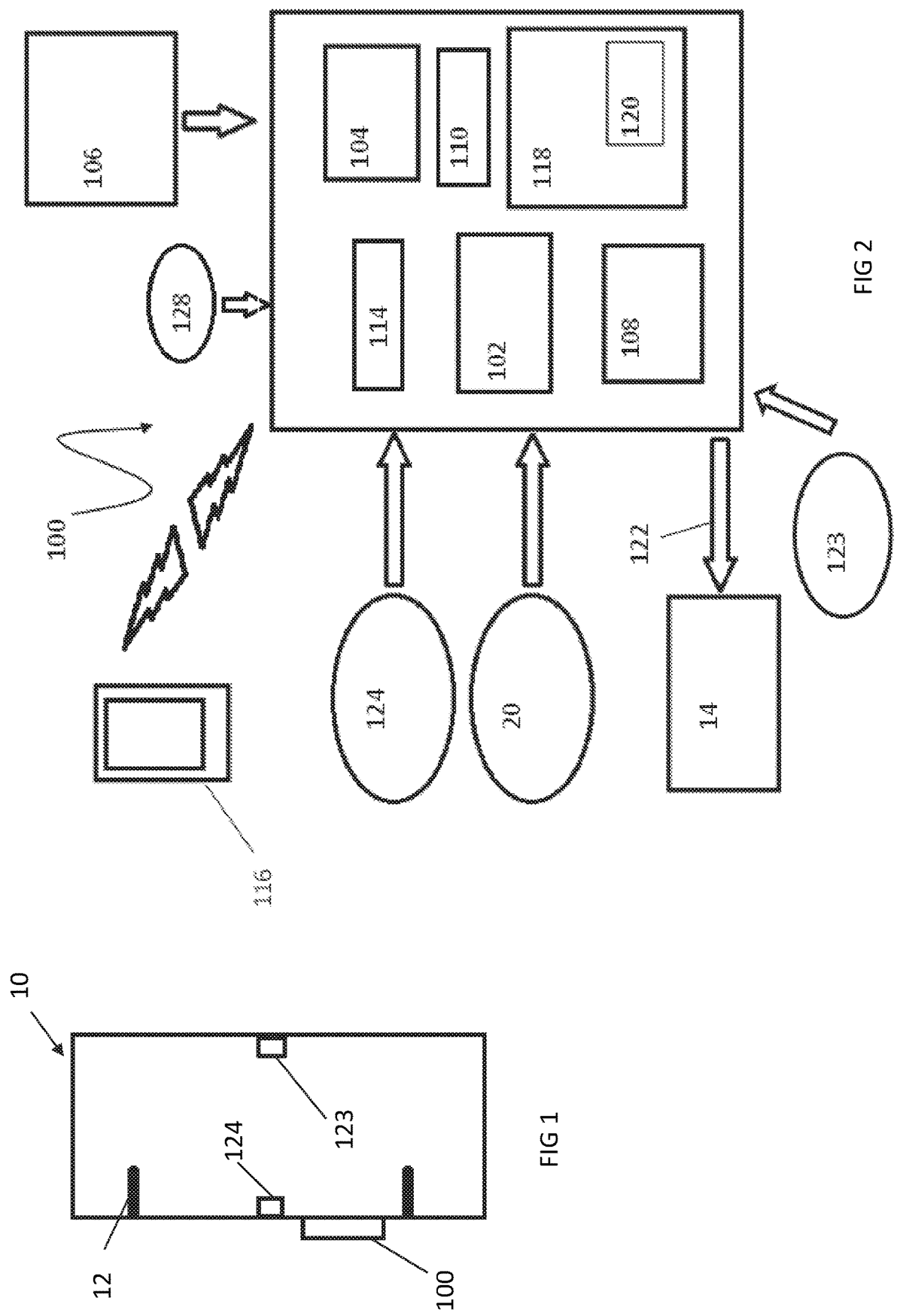

WATER HEATER CONTROLLER

RELATED APPLICATIONS AND PRIORITY CLAIM

The present application claims priority to Australian patent application number 2016903693, filed Sep. 14, 2016, and titled "Water Heater Controller", the entire content of which is incorporated herein by reference.

FIELD OF THE INVENTION

The present invention relates to controllers for water heaters.

BACKGROUND OF THE INVENTION

As a measure to encourage users to use energy intensive appliances in periods where there are moderate to low demands on the electricity grid, power suppliers have introduced time of use tariff periods, where the energy tariffs during peak periods are higher than those during low demand periods. A further measure to reduce peak demand is provided by Australian Standard 4755 (AS4755) compliant "demand response enabling devices", which allow the power supplier to control the operations of the appliances, to manage the demand on the system. Built in devices included in or retrofittable devices added to water heaters, to optimise the responses of the water heaters to these periods, are desirable as they help reduce the energy consumption cost.

Any reference herein to known prior art does not, unless the contrary indication appears, constitute an admission that such prior art is commonly known by those skilled in the art to which the invention relates, at the priority date of this application.

SUMMARY OF THE INVENTION

The present invention provides a controller for an electric booster element in a water heater, the electric booster element being powered from mains power, the controller comprising a control module, a capacitive module adapted to store power and supply stored power to the control module, the control module producing a control signal for controlling a relay to supply or restrict mains power supply to the booster element, the control signal depending at least in part on a time of use data.

The controller can include a timer that provides a time data to the control module.

The control module can be adapted to prevent the booster element from operating during at least one predetermined time of use tariff period.

The capacitive module can be connected to mains power and enables the controller module to function in the event of a power outage.

The capacitive module can receive power from a photovoltaic module.

The capacitive module can include a supercapacitor.

The controller can monitor a tariff period signal from a power supplier to mark a start and/or an end of a tariff period, and synchronises the timer module with the tariff period signal.

The signal can be a Zellweger signal from mains power.

The control module can receive input from a ripple signal meter that monitor the Zellweger signal.

The ripple signal meter can be part of the water heater.

The tariff period signal can be wirelessly transmitted from the power supplier and received by a communications module of the controller.

The timer can be a real time clock.

The water heater or the control module can include a demand response enabling device (DRED) adapted to receive a signal for a DRED event that requests the booster heater to be off.

The control module can monitor a level of usable hot water, and overrides the signal requesting the booster heater to be off, if the level of usable hot water is less than a predetermined level.

The controller module can receive a temperature input from a temperature sensor, wherein the controller overrides the signal requesting the booster heater to be off, if the temperature sensed by the sensor is lower than a threshold.

A height of the sensor in relation to a height of the water tank can be determined by a volume of the water tank, so that a predetermined volume water is located above the sensor.

The present invention also provides a controller for a water heater which has an electric booster element, the booster element being powered from mains power, including a control module which controls a relay to allow or interrupt power supply to the booster element, the control module receiving a request from a demand response enabling device (DRED) that the booster element be off, the control module monitoring a level of usable hot water to override or enable the request, depending on the level of usable hot water.

The demand response enabling device can be part of the water heater, or is part of the controller.

The controller module can receive a temperature input from a temperature sensor, wherein the controller overrides the request, if the temperature sensed by the sensor is lower than a threshold.

A height of the sensor in relation to a height of the water tank can be determined by a volume of the water tank, so that a predetermined volume of water is located above the sensor.

The present invention also provides a controller for an electric booster element in a water heater, the electric booster element being powered from mains power, the controller comprising a control module, the control module being adapted to receive power from a photovoltaic module, the control module producing a control signal for controlling a relay to supply or restrict mains power supply to the booster element, the control signal depending at least in part on a local solar time data derived from a power production of the photovoltaic module.

The photovoltaic module is oriented due north, or alternatively the photovoltaic module is oriented at an orientation that is not due north, and the local solar time data incorporates a solar time correction factor to account for the orientation.

The present invention also provides a water heater including a controller mentioned in the paragraphs above.

The present invention further provides a method of controlling an electric booster element in a water heater, the electric booster element being powered from mains power, including: storing energy from a mains power circuit in a capacitive element, receiving a time of use signal, providing a control module which generates a control signal based on the time of use signal, to allow or restrict mains power supply to the electric booster element, supplying power from the capacitive element in the event of a mains power failure to maintain operation of the control module.

The capacitive element can further receive power from a photovoltaic module.

The present invention also provides a method of controlling an electric booster element in a water heater, the electric booster element being powered from mains power, including: receiving a request from a demand response enabling device (DRED) that the operation of the electric booster element be restricted or interrupted, receiving a signal indicating a level of usable hot water remaining in the water heater, and overriding the request from the DRED if the level of usable hot water remaining in the water heater is lower than a predetermined amount.

BRIEF DESCRIPTION OF THE DRAWINGS

An embodiment or embodiments of the present invention will now be described, by way of example only, with reference to the accompanying drawings, in which:

FIG. 1 is a schematic view showing a water heater having an electric booster element and a controller for controlling the electric booster element;

FIG. 2 is a schematic view of a controller arrangement;

DETAILED DESCRIPTION OF THE EMBODIMENT OR EMBODIMENTS

Figure 3:
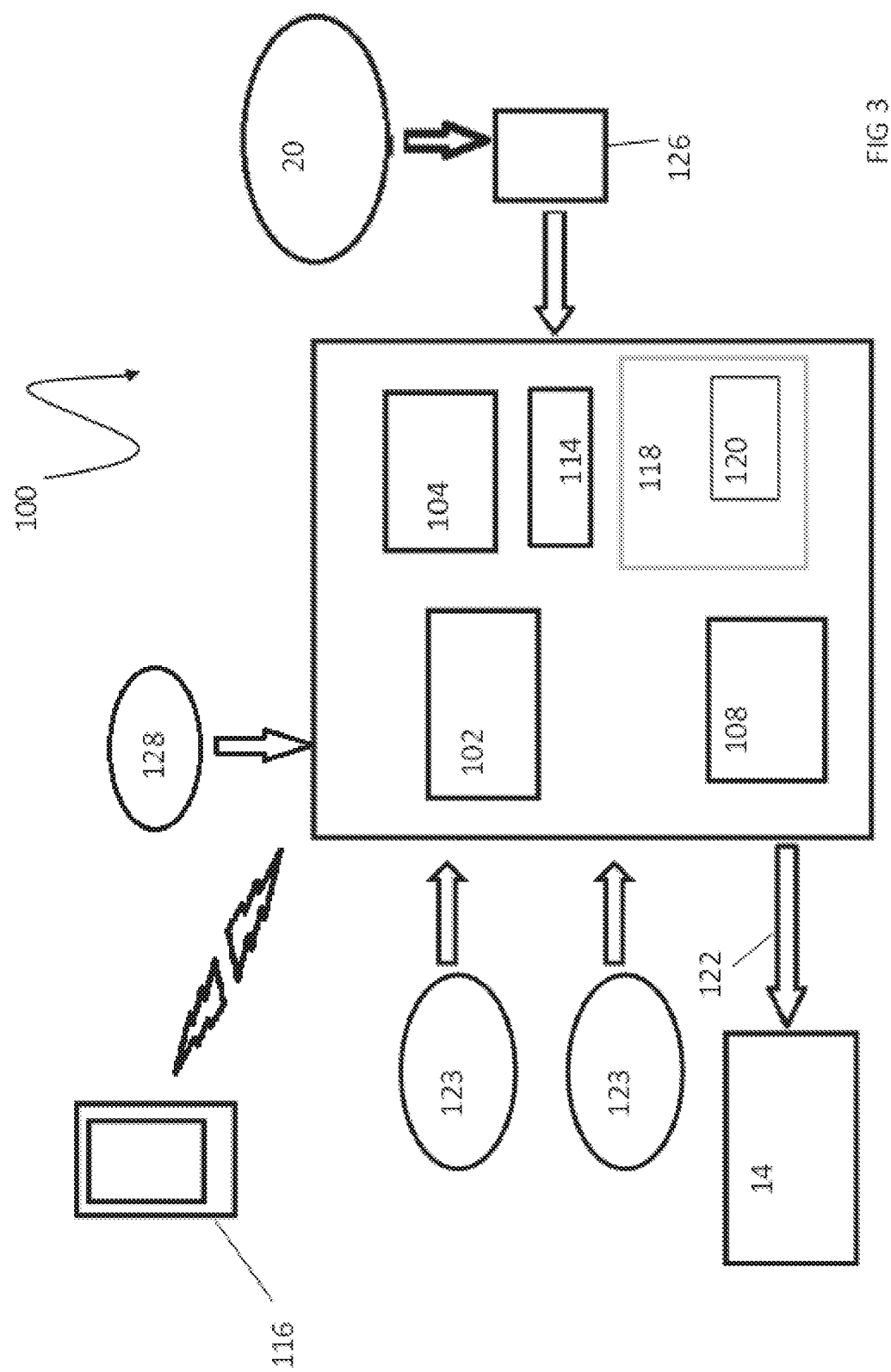
FIG. 3 is a schematic view of another controller arrangement.

FIG. 1 depicts a water heater 10 which has an electric booster element 12. The booster element 12 is powered by e.g. the mains power circuit 20 (not shown). The controller 100 is retrofittable, to a location on or external to the water heater 10, to control the operation of the booster element 12 in the water heater 10. The controller 100 can optionally fit inside the electrical cover for the water heater 10.

The controller 100 is provided to control the operation of the booster element 12, to preferably regulate the operation of the booster element 12 in accordance with the certain time periods. For example, the controller 100 will turn on the booster element 12 during an off-peak period or a period with lower network pricing. For instance, the control module 102 can further regulate the operation of the controlled appliance (i.e. the booster element in the water heater), to achieve a flatter load profile for the consumer to benefit from "cost reflective" tariffs or network pricing. The controller 100 is retrofittable to the water heater 100, or can be installed to the water heater 10 at the time of manufacture.

FIG. 2 depicts a controller arrangement 100. The controller 100 is powered by the mains power circuit 20. The controller 100 includes a control module 102 and a capacitive module 104. The capacitive module 104, for example a supercapacitor, is adapted to store power from the mains power circuit 20, and supply the stored power to the components in the controller 100 where required, e.g. in case of a mains power outage. The continued supply of power to the timer module 118 and the control module ensures correct time is maintained even during power loss.

Optionally, the controller module 102 is also powered during daylight hours by a solar arrangement, such as a photovoltaic module 106. The photovoltaic module 106 optionally will also supply the charge to be stored by the capacitive module. The PV module supplies power only during daylight hours, in the case of a power outage. Some existing supercapacitors can only power a microcontroller for a limited period, e.g. of about 48 hours. Therefore, by using solar charging to charge the controller module 102, the energy store in the supercapacitor 104 is maintained during the daylight hours. The controller 100 is thus better able to cope with periods of extended power outage. The photovoltaic module 106 can also charge the capacitive module 104.

The control module 102, such as a microcontroller, produces a control signal for controlling a relay 108 to supply or restrict the mains power supply to the booster element 12. For example, the relay 108 can provide switching control to the thermostat 14 for the booster element 12 (see FIG. 1). The relay 108 can be a mechanical or solid state relay, such as one including a triode for an alternating current (TRIAC). In the case of a mechanical relay being included, the relay 108 will be the only moving part in the controller 100.

The signal to allow or restrict the mains power supply is generated depending on the time of use, and the tariff period into which the time of use falls. The control module 102 includes non-volatile memory 110 to store the tariff data. The non-volatile memory 110 can also optionally store the daylight hours data in embodiments where photovoltaic panels are used. The data can be pre-loaded into the module 102, or it can be programmed into the module 102 after installation, whether by the telecommunications link, wired link and entry pad or any appropriate means. In one embodiment, the controller 100 will be fitted with a communications module 114 for wireless communication, e.g. Bluetooth or Wi-Fi communication. This enables an installer to program the data into the module 102 via e.g. a smart phone 116.

The control module 102 receives input from a timer module 118, preferably a real time clock (RTC), to keep accurate time of use data. The timer module 118 optionally includes a battery 120. The control module 102 thus checks the time of use with the tariff period information in the non-volatile memory 110, and produces a control signal 122 to regulate the operation of the booster element 12, so that the booster element 12 is regulated to time-of-use or cost reflective tariff periods, unless otherwise demanded to be in operation by the user's water consumption. The control is enabled by the relay 108 which switches the power supply path to the thermostat 14 to be open or closed. Absent the local water usage demand, the control module 102 is adapted to prevent the booster element 12 from operating or restrict the booster element's operation during at least one predetermined time of use or cost-reflective tariff period, such as the peak tariff period.

In a slightly different embodiment shown in FIG. 3, the controller 100 does not rely, or does not rely exclusively, on a timer module 118 to determine which tariff period applies. The timer module 118 can still be included as a back up, and is thus represented in FIG. 3 by phantom lines. The control signal 122 is generated using signals supplied from the energy supplier. For instance, energy suppliers commonly superimpose "ripple signals" to the standard alternating current which will serve as the carrier current, the ripple signals ("Zellweger signals") being provided at a higher frequency than the standard alternating current. The ripple signals are injected by the energy supplier at specific times. For example, the ripple control signals are injected during peak or off-peak periods by the energy supplier to control peak electricity demand. Therefore, by detecting the presence of ripple control signals, the control module 102 can detect the tariff period.

The control module 102 therefore uses the ripple control signal to control the relay 108. The controller 100 will receive data from a ripple meter 126 which is either external to the controller 100 or may possibly be internal to the controller 100, and which is adapted to detect the ripple control signal from the mains power circuit 20. In embodiments where the ripple control signals are being monitored and a time module is included, the controller 100 monitors the tariff period signal, e.g. the ripple control signals, from the power supplier to mark a start and/or an end of a tariff period, and synchronises the timer module with the tariff period signal.

The tariff period signal can be wirelessly transmitted from the power supplier or another entity, and received by a communications module 114 of the controller.

In the depicted embodiments, the photovoltaic module 106 optionally can be used to provide a local "solar" time reference point. When the "solar time" is used, the control signal produced by the control module 102 depends at least partly on the local solar time data derived from the power production of the photovoltaic module 106.

For example, if the photovoltaic module 106 faces due north, then the average mid-point of the time period in which there is photovoltaic power production is the local "solar noon". If the photovoltaic module 106 faces another direction, e.g. west or east, then the "solar noon" will be calculated by adding or subtracting an amount of time, or "solar time correction factor", to the average mid-point of the photovoltaic power production time period. Upon installation and the commissioning of a controller 100, the orientation data for the photovoltaic module 106 may be entered. In one embodiment, the orientation data is entered into an application on a smartphone or device carried by the installer. The application then calculates the expected time of the local solar noon, and transmits the expected time for the local solar noon to the control module 102. Alternatively, the application transmits the orientation data to the control module 102 and the control module 102 will calculate when the expected "solar noon" is in relation to the mid-point of the photovoltaic power production, and the time at which the solar noon is expected to occur. If the timer module 118 malfunctions or stops working, the control module 102 can use the local solar noon recorded as a reference to estimate or calibrate the actual time.

The control module 102 may keep a daily record of the "solar time". For example it will record the actual time at which the local "solar noon" occurs every day in its non-volatile memory 110. In the event of a failure of the timer module 118, the control module 102 will thus have access to the most recent local solar noon time, for the purpose of time calibration.

In the embodiments depicted in FIGS. 2 and 3, the water heater 10 or the controller 100 further includes or cooperates with a demand response enabling device (DRED) 128 adapted to receive a signal 128 for an AS4755 DRED event that requests the booster element 12 to be off or its operation restricted. The signal 128 may be a logic signal In the event of receiving this signal 128, the control module 102 will determine whether to switch off the booster element 12. The controller 100 thus has the capability to be DRED compliant. An example of a DRED event is a spike in the energy demands in the electricity grid, requiring the power company to restrict (reduce or stop) the power supply in order to manage the demand and protect the grid.

The controller module 102 will preferably have a mechanism of overriding the DRED signal if the user's water consumption requires the booster element 12 to be on, or to ensure an adequate amount of heated water is present.

To do so, the control module 102 monitors the level of usable hot water in the water heater 10, and overrides the DRED signal 128 requesting the operation of the booster element 12 to be off or reduced, if the level of usable hot water is less than a predetermined level. As shown in FIGS. 2 and 3, controller module 102 receives a temperature input from a temperature sensor 124. The temperature sensor 124 will be located either within the water tank or external to the shell of the water tank but internal to the insulation around the water tank (see FIG. 1).

As hot water will rise to the upper levels of a tank, the temperature sensor 124 is positioned so as to ensure that at least a predetermined volume of hot water will be above the sensor 124. Thus, for a water tank with a larger cross section, the sensor 124 will be located higher, and for a water tank with a smaller cross section the sensor 124 will be located lower. For example, for a 315 litre cylindrical tank the sensor is provided at around the 50% height of the tank, and for a 25 litre tank the sensor is provided near the bottom of the tank. This override procedure helps ensure that the volume of water above the sensor will be "hot" (i.e. of at least the predetermined temperature threshold).

The controller 100 overrides the DRED signal, if the temperature sensed by the sensor 124 is lower than a threshold. If the temperature sensed by the sensor 124 is above the threshold, then the control module 102 will accept or approve the DRED control to restrict the operation of the booster element 12. The behaviour of the control module 102 when the temperature is at the temperature threshold depends on the programming of the module 102 and does not affect the spirit of this feature. That is, depending on the programming, the control module 102 will override the DRED signal when the temperature is at the threshold, or still allow the DRED signal to restrict the booster element when the temperature is at the threshold.

The sensor 124 data can be similarly used by the controller 100 to determine whether to allow normal booster operation during a peak tariff period or peak load period. That is, the controller 100 does not restrict the operation of the booster element even when it determines that a peak tariff period is in effect, if the temperature sensed by the sensor 124 is below a predetermined threshold. This threshold temperature may be the same or different from the threshold temperature used to determine whether to override a DRED request 128. Alternatively the temperature data can be provided by a second sensor 123 which is installed at the same or a different location as the first sensor 124. The minimum hot water volume for determining whether to override peak tariff period control can be the same as or different than the minimum hot water volume for determining whether to override a DRED request.

Figure 4:
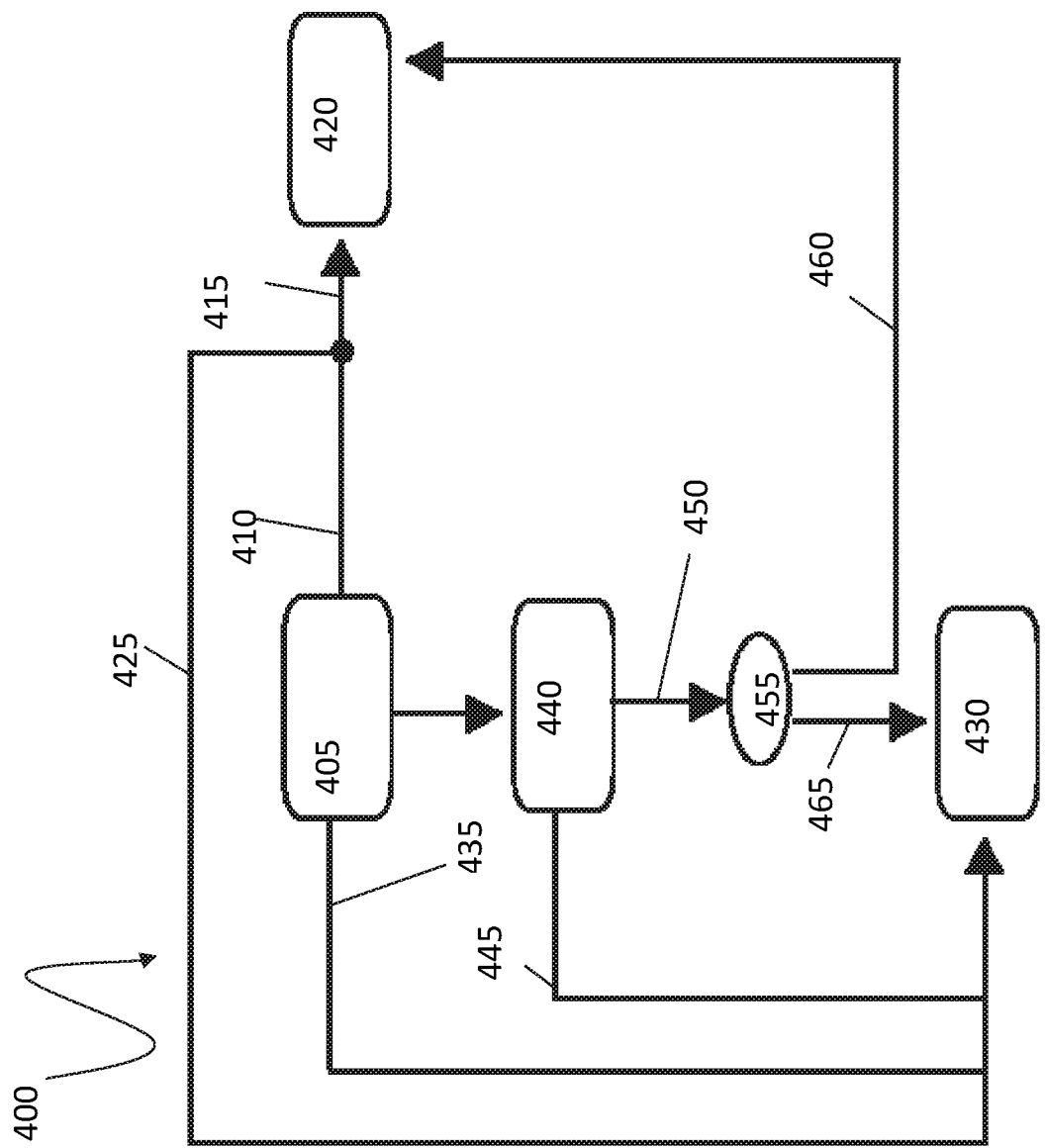
FIG. 4 is a flow chart showing a control process enabled by the controller arrangement.

One of the control methods 400 that can be embodied by the controller 100 is shown in FIG. 4. As shown, in step 405 the controller determines whether an off-peak tariff period applies. As explained above, this step 405 can be effected by the controlling module 102 cross-checking the timer data with a tariff period data, or by receiving a tariff period signal such as a ripple control signal or a wireless signal from the power company. If the current tariff is a restricted period 410, and there is no user demand which requires the booster to be on 415, the control module will restrict the operation of the booster element 420. If the current tariff is a restricted period 410 but booster operation is demanded by water usage 425, the control module will produces a signal to the relay to allow the operation of the booster 430. If the control module 102 does not detect a tariff period which requires restriction on booster operation 435, then it produces the control signal to allow the operation of the booster 430.

While off-peak, if the embodiment is DRED compliant 440 and a DRED event is not detected 445, the control module produces the signal to allow the booster operation 430. If a DRED event is detected in an off-peak period 450, then the control module will check whether the water temperature is above the threshold at the temperature sensor 455. If the temperature is above the threshold 460, then the control module produces the signal to restrict the booster operation 420. If the temperature is below the threshold 465, then the control module produces the signal to allow booster operation 430.

The skilled person will recognise that the DRED controls employed by the example can be stand-alone. That is, the controller may apply the DRED control without the time-of-use or cost-reflective controls to regulate the operation of the booster element.

Figure 5:
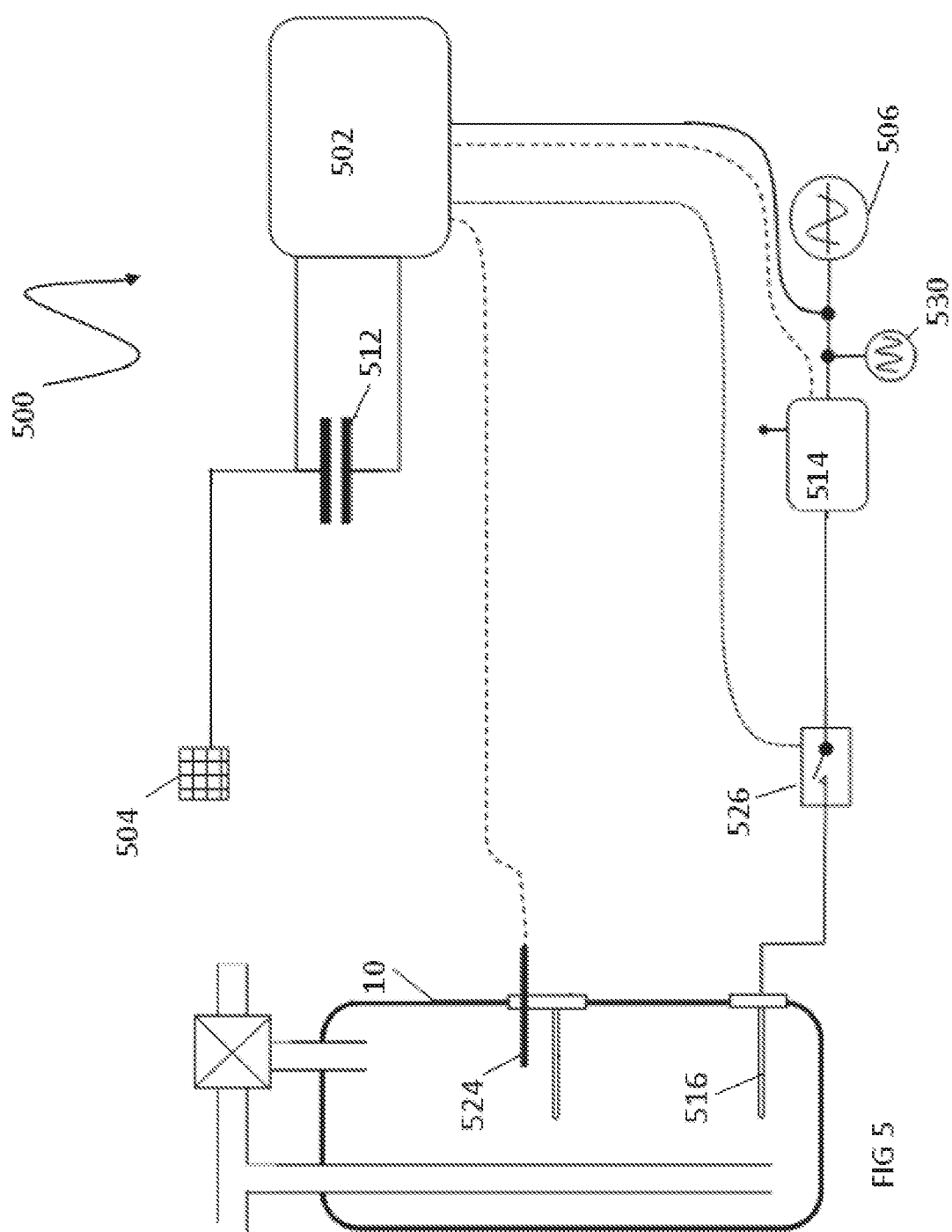
FIG. 5 is a schematic circuit implementation of the controller arrangement and the water heater being controlled.

FIG. 5 depicts, as an example only, a conceptual circuit 500 to show how a controller may be implemented. In FIG. 5, solid lines connecting between different components represent power connections; dashed lines represent data connections, and dotted lines represent control connections. The control module 502 receives power both from a photovoltaic cell(s) 504 and the mains power 506. The photovoltaic cell(s) 504 produces a low voltage direct current output into the supercapacitor 512.

The mains power line 506 may also power a DRED 514 which provides a DRED logic input to the control module 502. A sensor 524 located in the water heater 10 provides temperature data to the control module 502 to override the signal from the DRED 514. If the sensed temperature is below the temperature threshold, the control module 502 enables a switching path to be closed, e.g. by switching on a switch 526, to allow the mains power circuit to power the booster element 516.

If a ripple meter is provided, the booster element 514 can be subject to off-peak ripple control 530 from the power company. In the depicted embodiment, the switching path 526 provided by the control module 502 to override the DRED 514 will be located downstream from the ripple control input 530, so that the ripple control signal 530 will be taken into account by the control module 502.

Figure 6:
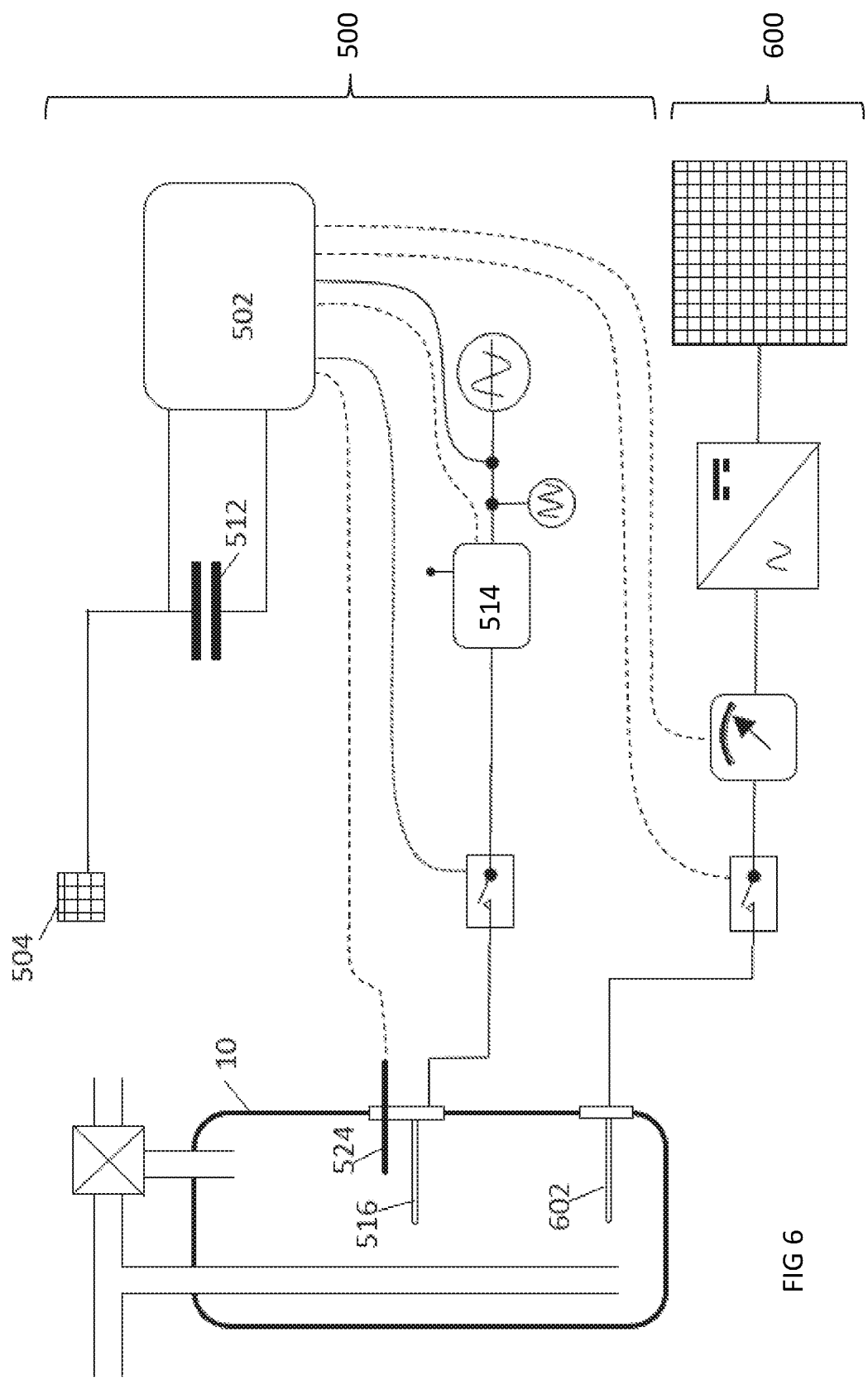
FIG. 6 shows the schematic circuit implementation of FIG. 5, with a further schematic circuit implementation of a solar power circuit to the main heating element in the water heater.

FIG. 6 depicts the conceptual circuit 500 shown in FIG. 5, with the further addition of a conceptual solar circuit 600 shown to provide an alternative power source to the main heating element 602. Other forms of heating the water heater may also be used in conjunction with the electric booster element control.

Figure 7:
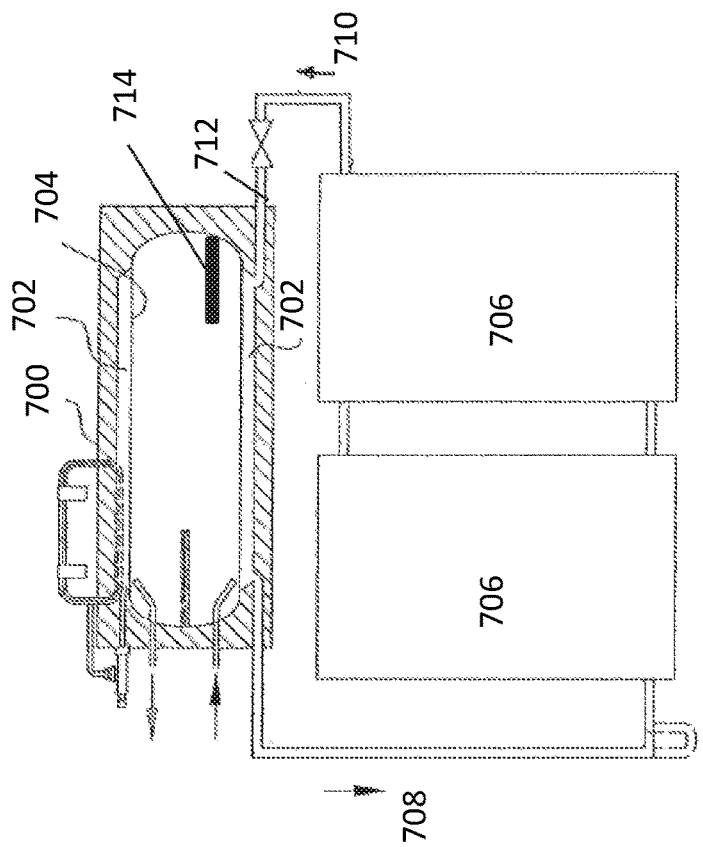
FIG. 7 is a schematic of an alternative arrangement for heating the water in the water heater.

For example, FIG. 7 depicts an arrangement where the heat transfer fluid is circulated between the jacket 702 around the water tank 704 of the water heater 700, and one or more the solar panel(s) 706. The direction of the circulation of the heat transfer fluid is represented by the arrows 708, 710, and is enabled by a thermosiphon effect provided by the heat of the solar panel(s) 706 being located below the hot water inlet 712 for the water tank 704. The booster element 714 is controlled by a controller arrangement falling within the scope of this specification.

Figure 8:
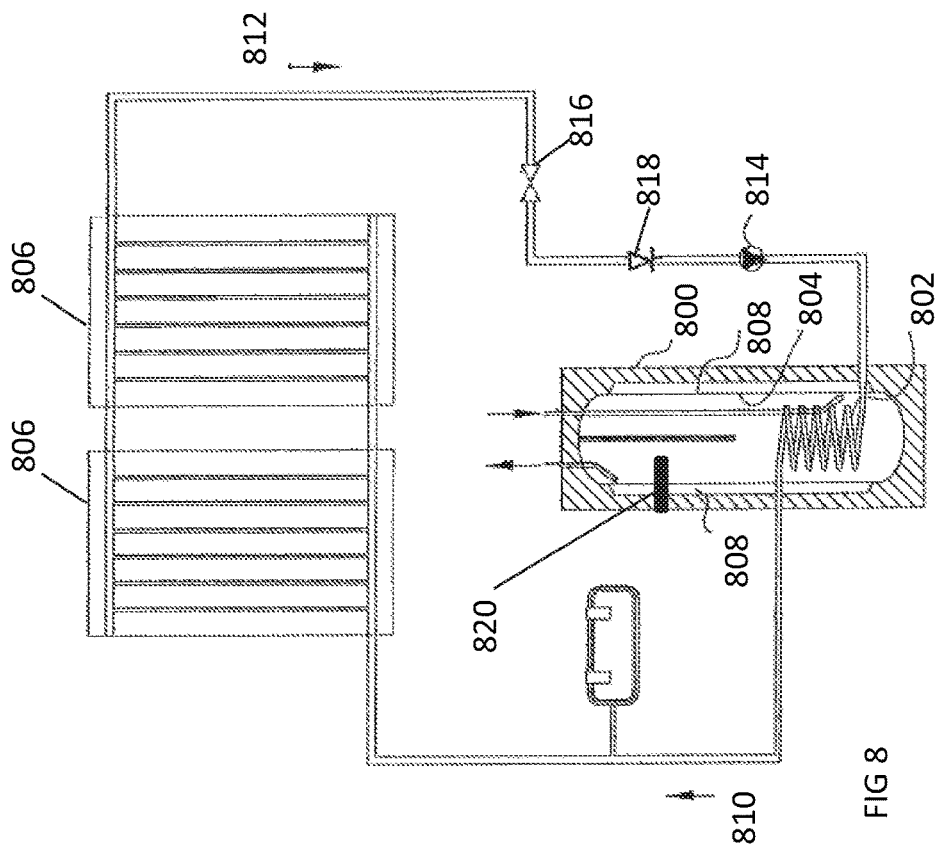
FIG. 8 is a schematic of another alternative arrangement for heating the water in the water heater.

FIG. 8 depicts an alternative arrangement where a heat exchanger 802 is located within the water heater 800, and is in communication with one or more solar panel 806. The jacket 808 around the water tank 804 contains vacuum or an insulation material, or both. In this example, the solar panels 806 are provided above the water heater 800. Therefore the circulation of the heat transfer fluid, the direction of which is shown by arrows 810, 812, is enabled by a pump 814. An isolation valve 816 and/or a one-way valve 818 ensures the correct direction of flow of the heat transfer fluid. The booster element 820 is controlled by a controller arrangement falling within the scope of this specification.

It should be appreciated that although in the above, the controller is described as controlling an electric booster element in a water heater, further applications of the controller are not intended to be excluded.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A controller for an electric booster element in a water heater, said electric booster element being powered from mains power, the controller comprising:
    a photovoltaic module;
    a control module configured to:
        determine a time of day based on stored solar noon data, the stored solar noon data being based on an orientation of the photovoltaic module and a photovoltaic power production of the photovoltaic module over a period of time;
        receive a request to reduce supply of mains power to the booster element;
        determine whether a tariff period is in effect based at least in part on the time of day;
        determine whether a temperature of water in the water heater is less than a predetermined level; and
        in response to determining that the temperature of water in the water heater is less than the predetermined level and the tariff period is in effect based at least in part on the time of day, maintain an unreduced supply of mains power to the booster element; and
    a capacitive module adapted to store power and supply stored power to the control module.

2. The controller of claim 1, comprising a timer module that provides the time of day to the control module.

3. The controller of claim 1, wherein said control module is adapted to prevent the booster element from operating during at least one predetermined tariff period.

4. The controller of claim 1, wherein said capacitive module is connected to mains power and enables said control module to function in the event of a power outage.

5. The controller of claim 1, wherein said capacitive module receives power from the photovoltaic module.

6. The controller of claim 1, wherein said capacitive module includes a supercapacitor.

7. The controller of claim 2, wherein said controller monitors a tariff period signal from a power supplier to mark a start and/or an end of the tariff period, and synchronises said timer module with said tariff period signal.

8. The controller of claim 7, wherein said tariff period signal is a Zellweger signal from mains power.

9. The controller of claim 8, wherein said control module receives input from a ripple signal meter that monitors said Zellweger signal.

10. The controller of claim 9, wherein said ripple signal meter is part of the water heater.

11. The controller of claim 7, wherein said tariff period signal is wirelessly transmitted from the power supplier and received by a communications module of the controller.

12. The controller of claim 2, wherein said timer module is a real time clock.

13. The controller of claim 1, wherein said water heater or said control module includes a demand response enabling device (DRED) adapted to receive the request for a DRED event that requests the booster element to be off.

14. The controller of claim 13, wherein said control module monitors a level of usable hot water, and overrides said signal request that said booster element to be off, if said level of usable hot water is less than a predetermined level.

15. The controller of claim 1, wherein said control module receives a temperature input from a temperature sensor to determine the temperature of water.

16. The controller of claim 15, wherein a height of said temperature sensor in relation to a height of a water tank of the water heater is determined by a volume of said water tank, so that a predetermined volume water is located above said temperature sensor.

17. A controller for a water heater which has an electric booster element, said booster element being powered from mains power, including a control module configured to allow or interrupt power supply to said booster element, said control module further configured to:
   determine a time of day based on stored solar noon data, the stored solar noon data being based on an orientation of a photovoltaic module and a photovoltaic power production of the photovoltaic module over a period of time;
   receive a request from a demand response enabling device (DRED) to reduce supply of mains power to the booster element;
   determine whether a tariff period is in effect based at least in part on the time of day;
   determine whether a level of usable hot water is less than a predetermined level; and
   in response to determining that the tariff period is in effect based at least in part on the time of day and the level of usable hot water is less than the predetermined level, maintain an unreduced supply of mains power to the booster element.

18. The controller of claim 17, wherein said demand response enabling device is part of the water heater, or is part of the controller.

19. The controller of claim 17, wherein said controller receives a temperature input from a temperature sensor, wherein said controller overrides said request, if a temperature sensed by said temperature sensor is lower than a threshold.

20. The controller of claim 19, wherein a height of said temperature sensor in relation to a height of a water tank of the water heater is determined by a volume of said water tank, so that a predetermined volume of water is located above said temperature sensor.

21. A method of controlling an electric booster element in a water heater, the electric booster element being powered from mains power, including:
   storing energy from a mains power circuit in a capacitive element;
   determining a time of a day based on stored solar noon data, the stored solar noon data being based on an orientation of a photovoltaic module and a photovoltaic power production of the photovoltaic module over a period of time;
   receiving a request to reduce a supply of mains power to the booster element;
   determining whether a tariff period is in effect based at least in part on a time of day;
   determining whether a temperature of water in the water heater is less than a predetermined level;
   in response to determining that the tariff period is in effect based at least in part on the time of day and the temperature of water in the water heater is less than the predetermined level, maintaining an unreduced supply of mains power to the booster element; and
   supplying power from said capacitive element in the event of a mains power failure to maintain operation of a control module.

22. The method of claim 21, wherein said capacitive element further receives power from the photovoltaic module.

23. A method of controlling an electric booster element in a water heater, the electric booster element being powered from mains power, including:
   determining a time of day based on stored solar noon data, the stored solar noon data being based on an orientation of a photovoltaic module and a photovoltaic power production of the photovoltaic module over a period of time;
   receiving a request from a demand response enabling device (DRED) to reduce supply of mains power to the booster element;
   determining whether a tariff period is in effect based at least in part on the time of day;
   determining whether a level of usable hot water remaining in the water heater is less than a predetermined level; and
   in response to determining that the tariff period is in effect based at least in part on the time of day and the level of usable hot water remaining in the water heater is less than the predetermined level, maintaining an unreduced supply of mains power to the booster element.

* * * * *